(12) United States Patent
Murasato (10) Patent No.: US 7,907,358 B2
(45) Date of Patent: Mar. 15, 2011

(54) HOLDING APPARATUS AND EXPOSURE APPARATUS

(75) Inventor: Naoki Murasato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/550,021

(22) Filed: Aug. 28, 2009

(65) Prior Publication Data

US 2010/0053783 A1  Mar. 4, 2010

(30) Foreign Application Priority Data

Sep. 4, 2008  (JP) .................................. 2008-227612

(51) Int. Cl.
  *G02B 7/02*   (2006.01)
  *G02B 15/14*  (2006.01)
(52) U.S. Cl. ........................ 359/819; 359/694; 359/822
(58) Field of Classification Search .......... 359/694–700, 359/811–824, 846, 849, 214, 221, 298, 665, 359/666

See application file for complete search history.

(56) References Cited

U.S. PATENT DOCUMENTS

| 5,822,133 | A  | * | 10/1998 | Mizuno et al. ................ 359/696 |
| 6,750,947 | B1 | * | 6/2004  | Tomita et al. .................... 355/52 |
| 7,031,082 | B2 |   | 4/2006  | Murasato ...................... 359/819 |
| 7,161,750 | B2 | * | 1/2007  | Takabayashi ................. 359/819 |

FOREIGN PATENT DOCUMENTS

| JP | 3894509 A    | 4/1997 |
| JP | 11-149029 A  | 6/1999 |

* cited by examiner

*Primary Examiner* — Mohammed Hasan
(74) *Attorney, Agent, or Firm* — Canon U.S.A., Inc., IP Division

(57) ABSTRACT

A holding apparatus includes a holding member configured to hold an optical element, the holding member having an internal space that extends in a circumferential direction and has different sectional shapes perpendicular to the circumferential direction on at least two locations, a fixing member arranged outside of the holding member and configured to fix the holding member from an outside of the holding member, and a pressing member configured to press the internal space by supplying a fluid to the internal space, and to deform the holding member.

7 Claims, 6 Drawing Sheets

HOLDING APPARATUS AND EXPOSURE APPARATUS

BACKGROUND OF THE INVENTION

1. Field of the Invention

The present invention relates to a holding apparatus and an exposure apparatus.

2. Description of the Related Art

Japanese Patent No. 3,894,509 discloses a holding apparatus configured to hold a projection optical system for a projection exposure apparatus that is configured to expose a pattern of an original, such as a reticle or a mask, onto a substrate, such as a wafer or a liquid crystal display, via the projection optical system. More specifically, Japanese Patent No. 3,894,509 discloses a first structure that tilts an optical element (lens) by using three air-driving elements arranged at an outer circumference of the lens, and a second structure that drives the optical element in the Z direction by using an annular diaphragm. Thereby, a deformation of the lens surface shape of the projection optical system which would otherwise occur due to the own weight and a temperature change of the projection optical system can be adjusted through holding by the holding apparatus.

Other prior arts Japanese Patent Laid-Open No. 11-149029 and U.S. Pat. No. 7,031,082.

However, according to Japanese Patent No. 3,894,509, the first structure requires independent controls over air supplying to three locations, and thus the control system become complex. In addition, the second structure cannot control tilting.

SUMMARY OF THE INVENTION

The present invention provides a holding apparatus and an exposure apparatus configured to tilt or to deform an optical element without complicating a driving control system for reducing deformations of the optical system.

A holding apparatus according to one aspect of the present invention includes a holding member configured to hold an optical element, the holding member having an internal space that extends in a circumferential direction and has different sectional shapes perpendicular to the circumferential direction on at least two locations, a fixing member arranged outside of the holding member and configured to fix the holding member from an outside of the holding member, and a pressing member configured to press the internal space by supplying a fluid to the internal space, and to deform the holding member.

Further features of the present invention will become apparent from the following description of exemplary embodiments with reference to the attached drawings.

DESCRIPTION OF THE EMBODIMENTS

Referring now to the accompanying drawings, a description will be given of the embodiments of the present invention.

Figure 1A:
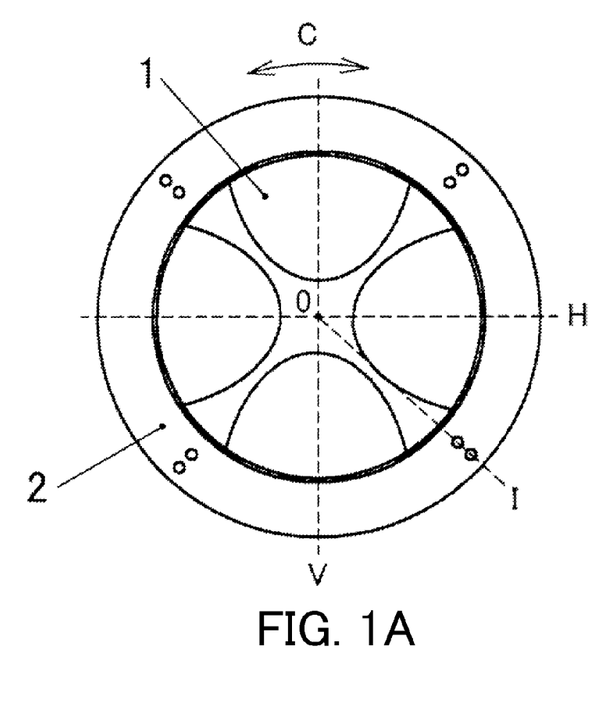
FIGS. 1A-1D are plane and sectional views showing a principle of a holding apparatus according to a first embodiment.

Referring now to FIGS. 1A to 2B, a description will be given of a principle of a holding member 2 configured to hold and to deform (or tilt) a lens member (optical element) 1. FIG. 1A is a schematic plane view of the holding member 2. FIG. 1B is a sectional view along an axis H in FIG. 1A. FIG. 1C is a sectional view along an axis I in FIG. 1A. FIG. 1D is a sectional view along an axis V in FIG. 1A. A point O denotes a center (origin) of the lens member 1. The axis H is a horizontal axis that passes the center O and extends in the horizontal direction. The axis I is an axis that rotates the axis H shown in FIG. 1A by 45° around the center O. The axis V is a perpendicular axis that rotates the axis H around the center O by 90° clockwise in FIG. 1A.

Figure 1B:
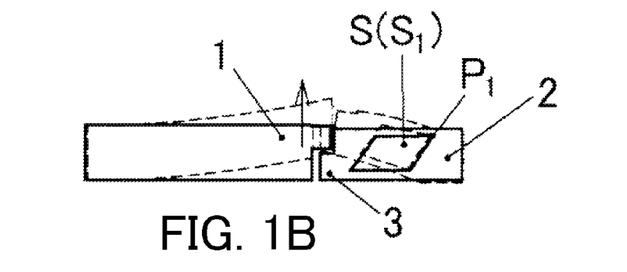
Figures 1C, 1D:
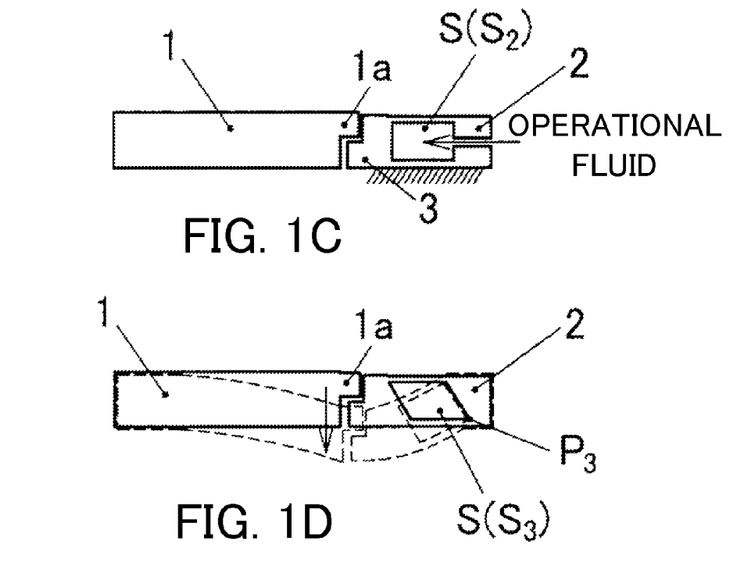

As shown in FIGS. 1B-1D, the holding member 2 has an internal space that extends in a circumferential direction C, and has shapes different from each other on sections (that parallel to the radial direction) perpendicular to the circumferential direction C on at least two locations in one circumference. The internal space S of this embodiment is connected over its entire circumference, and configured to deform the holding member 2 when a fluid is supplied to the internal space S from a tube at one location so as to press the internal space S. The holding member 2 is an annular member that has an L-shaped section, and has a convex 3 that projects to the inside (or toward the lens member 1) at the lower left part in FIGS. 1B-1D. On the other hand, the lens member 1 has a disc member but the end has a reverse L-shaped section, and has a convex 1a that projects to the outside (or toward the holding member 2) at the upper right part in FIGS. 1B-1D. Before the internal space S is compressed, the reverse L-shaped part of the convex 1a and the L-shaped part of the convex 3 overlap each other. Before the internal space S is pressed, the convex 3 supports the lens member 1. The outer circumference surface of the convex 1a of the lens member 1 is adhered to and fixed onto the lens member 2. While the bottom surface of the convex 1a contacts but is not adhered to the top surface of the convex 3, they may be adhered to each other when the convex 1a is unlikely to destroy.

Figure 2A:
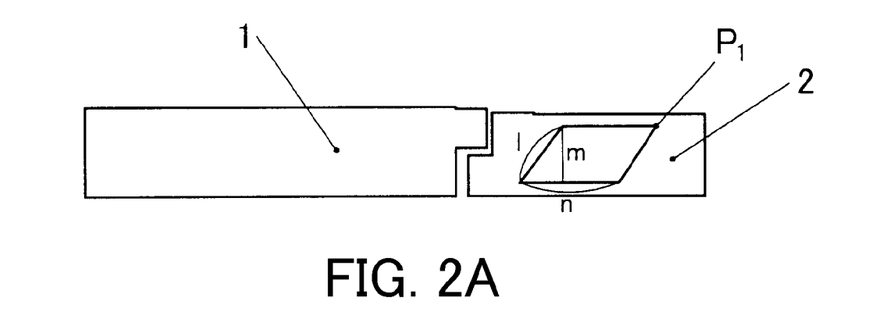
FIGS. 2A-2B are enclosed sectional views of FIG. 1D.

A section shown in FIG. 2A parallel to the axis H shown by a solid line in FIG. 1B shows a pre-compression state of the internal space S. At this time, the internal space S is an internal space $S_1$. The sectional shape of the internal space $S_1$ has a parallelogram shape that is made by inclining a rectangle to the right, and an intersection $P_1$ between two sides that form the outermost acute angle is located at the upper right position among four angles of the parallelogram. As shown in FIG. 2A, the sectional area of the internal space $S_1$ is expressed by n×m.

Figure 2B:
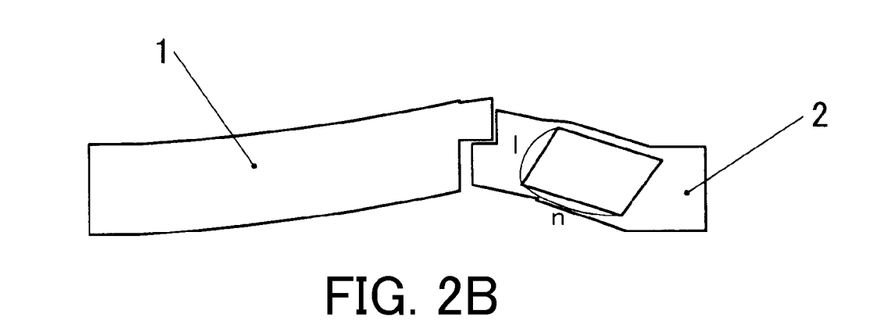

The internal space $S_1$ upwardly deforms in a direction approaching to a rectangle when it is pressed or to the upper side, as shown by broken lines in FIGS. 1B and 2B, and the sectional area becomes l×m. Since a depth perpendicular to the paper plane does not change and "l" is larger than "m," a direction in which the volume of the internal space S increases is a direction in which the sectional shape approaches to the rectangle from the parallelogram. Since another member (not shown) fixes the holding member 2 from an outside of the holding member 2, the inner part than the internal space $S_1$ upwardly deforms when the internal space $S_1$ is pressed. Accordingly, the lens member 1 upwardly deforms because the convex 3 lifts up the convex 1a.

The section parallel to the axis I shown by a solid line in FIG. 1C shows the pre-pressed state of the internal space S, and the internal space S becomes an internal space $S_2$. The sectional shape of the internal space $S_2$ of the holding member 2 has a rectangular shape. The internal space $S_2$ little deforms even when it is pressed.

The section parallel to the axis V shown by a solid line in FIG. 1D shows the pre-pressed state of the internal space S. At this time, the internal space S becomes an internal space $S_3$. The sectional shape of the internal space $S_3$ has a parallelogram shape that is made by inclining a rectangle to the left, and an intersection $P_3$ between two sides that form the outermost acute angle among four angles of the parallelogram is located at the lower right position. The internal space $S_3$ downwardly deforms in a direction approaching to a rectangle when it is pressed, as shown by a broken line in FIG. 1C.

A direction in which the volume of the internal space $S_3$ increases is a direction in which the sectional shape approaches to a rectangle from the parallelogram, and the holding member is fixed by the other member from the outside of the holding member. Thus, the inner part than the internal space $S_3$ downwardly deforms when the internal space $S_3$ is pressed. As described above, the outer circumferential surface of the lens member 1 is adhered to and fixed onto the holding member 2. Therefore, as the holding member 2 downwardly deforms, the lens member 1 downwardly deforms accordingly.

When the deformations of the sectional shape shown in FIGS. 1B, 1C, and 1D are repeated twice over the circumference of the holding member 2, these deformations are converted into a deformation of the lens shape which provides upper and lower changes at two periods. In other words, a plurality of (two in this embodiment) pairs of a part (internal space $S_1$) configured to upwardly deform the holding member 2, and a part (internal space $S_3$) configured to downwardly deform the holding member 2 are periodically arranged in the internal space S in the circumferential direction C.

Figure 3:
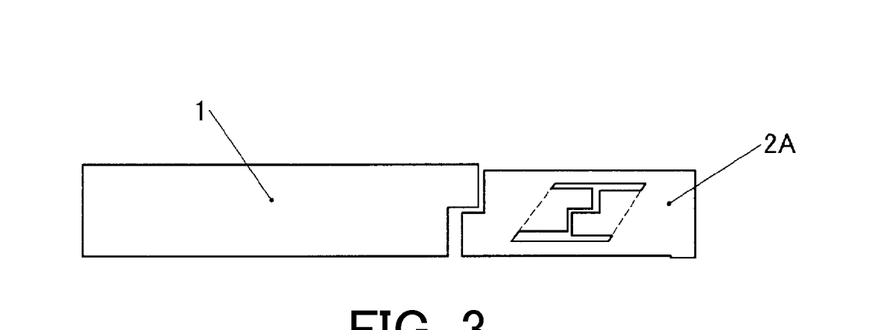
FIG. 3 is an enlarged sectional view of a variation of FIG. 1B.

In addition, the sectional shapes of the parallelogram of the internal spaces $S_1$ and $S_3$ may have a convex or a concave at each surface or inside, as long as a shape made by connecting both ends of the top and bottom sides to each other like broken lines in FIG. 3 forms a parallelogram. FIG. 3 illustrates that a shape made by connecting a plurality of ends to each other in the internal space S on the section perpendicular to the circumferential direction C of the internal space S in the holding member 2A is a parallelogram. Moreover, another shape that is not a perfect parallelogram, such as a shape close to a trapezoid, can turn into a rectangle when it is compressed, and thus is applicable. The sectional shape of the internal space S may be a polygon having more than four sides.

First Embodiment

Figure 4:
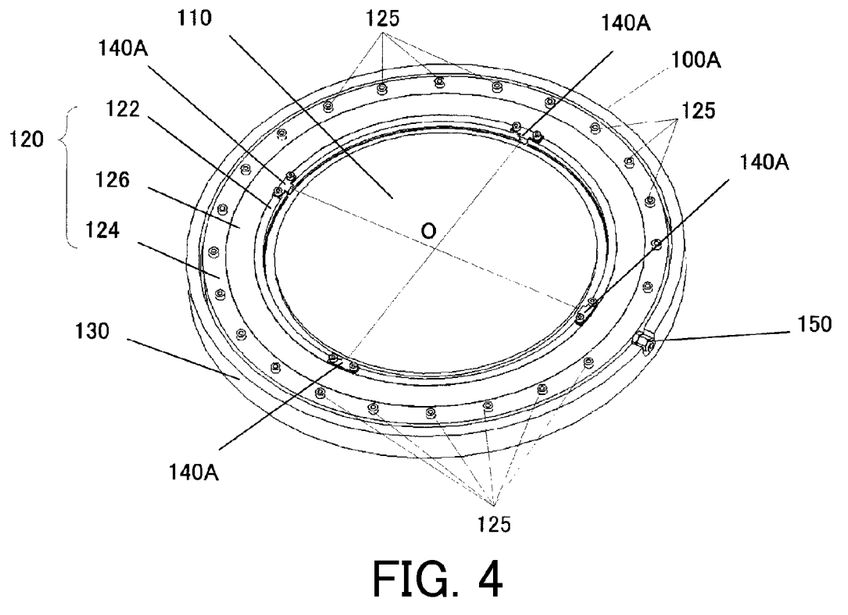
FIG. 4 is a perspective view of the holding apparatus according to the first embodiment.
Figure 5:
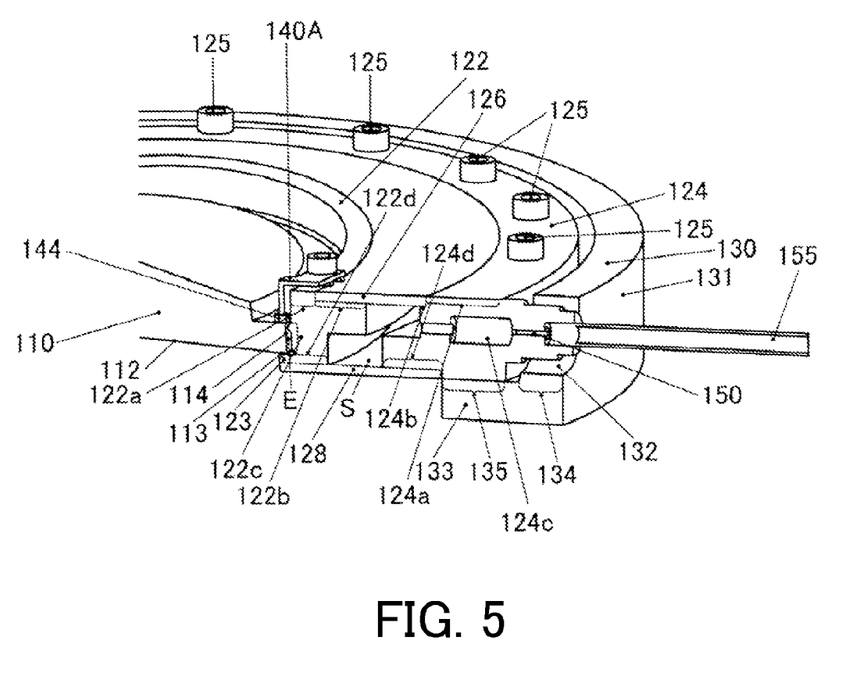
FIG. 5 is a partially enlarged sectional and perspective view of FIG. 4.

FIG. 4 is a perspective view of the holding apparatus 100A of the first embodiment, which is configured to hold a lens member (optical element) 110 corresponding to the lens member 1 shown in FIG. 1. FIG. 5 is a partially sectional and perspective view of FIG. 4.

The holding apparatus 100A includes a holding member 120, a fixing member 130, an elastic fixing member 140A, a tube member 150, a tube 155, a closed container 160, and a pneumatic controller 170. FIG. 4 omits the closed container 160 and the pneumatic controller 170.

The holding member 120 includes an inner part 122, an outer part 124, an upper part 126, and a lower part 128 that is omitted in FIG. 4.

The inner part 122 directly holds the lens member 110, and determines the inside of the internal space (pressing space). The inner part 122 has a reverse L-shaped section in FIG. 5, and includes an inner circumference part 122a, a connector 122b, an inner side surface 122c to which the lens member 110 is adhered, a connector 122d, and a convex 123 that projects to the inside.

The inner circumference part 122a is an annular member that is coupled with an inner circumference part of the connector 122b, and upwardly projects further than the connector 122b, and the top surface is level with the top surface of an outer circumference part 131 of the fixing member 130, which will be described later. The inner circumference part 122a is arranged opposite to the lens member 110.

The connector 122b is an annular step that is provided at a lower position than that of the inner circumference part 122a, and the upper part 126 is adhered to the top surface of the connector 122b.

The inner side surface 122c is an inner surface of the inner circumference 122a, and the outer wall surface 114 of the lens member 110 is adhered to and fixed onto the inner side surface 122c by elastic adhesive E. This configuration can restrain a lateral (or radial) displacement of the lens member 110. The elastic adhesive E may be applied to the outer wall surface 114 of the lens member 110 partially rather than entirely depending upon the elastic degree of the elastic adhesive E and the weight of the lens member 110.

The connector 122d is an annular bottom part of the inner part 122, and the lower part 128 is adhered to the bottom of the connector 122d. If necessary, a step or convex, such as a step between the inner part 122a and the connector 122b, may be formed on the inside of the connector 122d.

The lens member 110 contacts the top surface of the convex 123 of the inner part 122 that directly supports the lens member 110. The convex 123 contacts an edge 113 of a bottom surface 112 of the lens member 110 with an area of about 1 mm×1 mm to 2 mm×2 mm. The edge 113 does not cause a chip or a crack in the lens member 110 due to the stress concentration, and is set to an area that does not transmit the surface roughness of the convex 123 as a deformation warp of the lens member 110. Totally four convexes 123 are provided at parts that lift up the lens member 110 and at parts that lower down the lens member 110. The convex 123 may be added between the lifting part and the lowering part in order to restrain the lens member 110 from entirely changing up and down in the deformation. In that case, the same number of elastic fixing members 140 will be added.

The outer part 124 is an annular member that determines the outside of the press space, and has an L-shaped section in FIG. 5. The outer part 124 is fixed onto the fixing member 130 via a plurality of fastening members 125 that are arranged at regular intervals on the circumference.

The outer part 124 includes an outer circumference 124a, a connector 124b, a through-hole 124c, and a connector 124d. The outer circumference part 124a is an annular member that has a top surface approximately level with the top surface of an outer circumference part 131 of the fixing member 130, which will be described later. The connector 124b is an annular step that is provided at a lower position than that of the outer circumference part 124a, and the upper part 126 is adhered to the top surface of the connector 124b. Before the internal space S is pressed, the top surface of the connector 124b is level with the top surface of the connector 122b. The through-hole 124c has a cylindrical shape, extends in the radial direction, and houses the tube member 150. The lower part 128 is adhered to the bottom surface of the connector 124d.

The upper part 126 is an annular thin-plate member or elastic member that is fixed between the inner part 122 and the outer part 124, and determines the top of the internal space (or top of the upper rectangle in FIG. 5). The top surface of the upper part 126 is approximately level with the top surface of the outer circumference part 131 of the fixing member 130, which will be described later. In other words, a height difference between the top surface of the inner circumference part 122a and the top surface of the connector 122b corresponds to a thickness of the upper part 126. The upper part is adhered to the top surface of the connector 122b of the inner part 122 and the top surface of the connector 124b of the outer part 124, and supported and fixed by the inner part 122 and the outer part 124. The upper part 126 can deform with the inner part 122, and may be a flat spring member.

The lower part 128 is an annular thin-plate member or elastic member that is fixed between the inner part 122 and the outer part 124, and determines the bottom of the internal space (or bottom of the lower rectangle in FIG. 5). The lower part 128 is adhered to the bottom surface of the connector 122d of the inner part 122 and the bottom surface of the connector 124d of the outer part 124, and is supported and fixed by the inner part 122 and the outer part 124. FIG. 4 omits the lower part 128. The lower part 128 can elastically deform with the inner part 122, and may be a flat spring member.

The inner space (press space) S has a shape that is made by overlapping two rectangles in the vertical direction while these rectangles are shifted or accorded in the radial direction. Similar to FIG. 1, the section shown in FIG. 5 has a shape that deforms in the vertical direction when the pressure is applied. In order to make the internal space S a closed space, each part (such as the inner part 122, the outer part 124, the upper part 126, and the lower part 128) of the holding member 120 is wax-jointed over the entire circumference. Another joint method may use a hip joint or a bolt joint, as long as it is a sealing method. The sectional shape of the internal space S continuously changes from a parallelogram shown in FIG. 1B at an angle of 0° with respect to the center O shown in FIG. 4, a rectangle shown in FIG. 1C at the angle of 45°, a parallelogram shown in FIG. 1D at an angle of 90°, and the same parallelogram at an angle of 180° as that at the angle of 0°. The sectional shape of the internal space S deforms with two periods over the entire circumference, and provides two parts each configured to upwardly deform and two parts configured to downwardly deform in the compression time. The sectional shape shown in FIG. 5 corresponds to the sectional shape at the angle of 0° or 180°, as described above. When the period of the deformation of the internal space is increased up to 3 or 4, the deformation shape of the lens member 110 deforms accordingly.

The fixing member 130 contacts the outer part 124 of the holding member 120, and holds the holding member 120 with the lens member 110. The position of the fixing member 130 is fixed outside of the internal space, and the fixing member 130 is made of a rigid material that does not change even when the internal space S is pressed. The fixing member 130 has a hollow disc shape having an L-shaped section.

The fixing member 130 includes an outer circumference part 131 and a bottom part 133. The outer circumference part 131 has an annular shape, and coupled with the bottom part 133 on the bottom surface. In addition, the outer circumference part 131 has a groove 132 that extends in the radial direction. The groove 132 has a U shape in the radial direction. The groove 132 is connected to the through-hole 124c of the outer part 124, and houses the tube member 150. The bottom part 133 is coupled with the outer circumference part 131 on the outer part 134, and the outer part 124 is fixed onto the inner part 135 via the fastening member 125.

Figure 6:
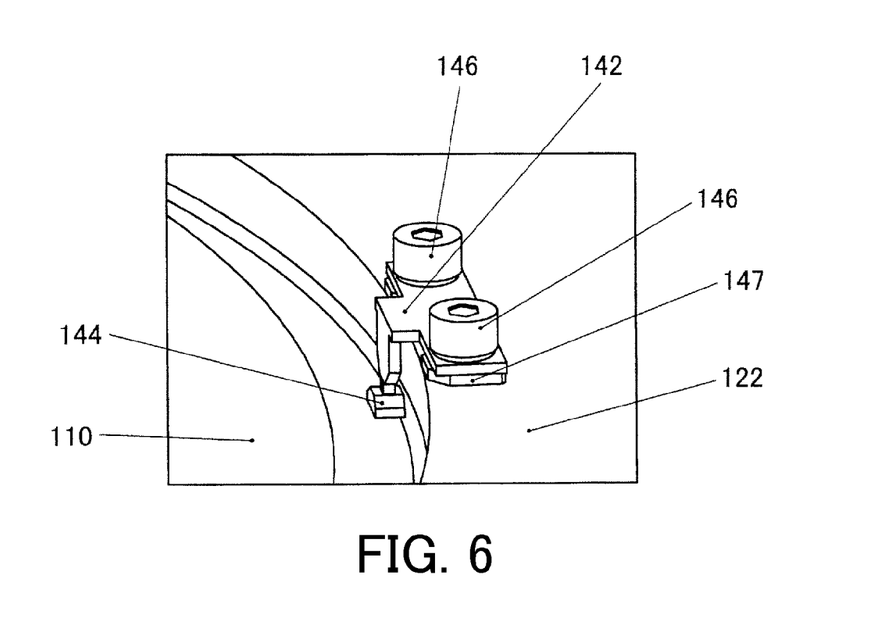
FIG. 6 is an enlarged perspective view around an elastic member shown in FIG. 4.

The elastic fixing member 140A contacts the lens member 110 and the holding member 120, and fixes the lens member 110. FIG. 6 is an enlarged perspective view of the elastic fixing member 140A that contacts the lens member 110 and the inner part 122, and fixes the lens member 110 via an elastic force. The elastic fixing member 140A includes a flat spring member 142, a pressure transmission member 144, a pair of fastening members 146, and an adjusting member 147.

The flat spring member 142 is fixed onto the inner part 122 by the fastening member 146, and generates a downward elastic force so as to fix the lens member 110. The pressure transmission member 144 is located between the lens member 110 and the flat spring member 142, contacts the upper edge of the lens member 110, and uniformly transmits the elastic force of the flat spring member 142 to the lens member 110. The pressure transmission member 144 is made of aluminum or brass having such low hardness that the lens member 110 does not suffer from cracks or chips. The fastening member 146 fixes the flat spring member 142 to the inner part 122. The adjusting member 147 is located between the flat spring member 142 and the inner part 122, and can adjust an elastic force generated by the flat spring member 142 by controlling the thickness of the height direction.

The tube member 150 supplies the air (fluid) for compression to and recovers the air from the internal space S. One end of the tube member 150 is connected to the internal space S, and the other end of the tube member 150 is connected to a tube 155. Since the internal space S in the holding member 120 is connected over its circumference in this embodiment, the number of tube members 150 configured to supply the fluid (air) and to compress the internal space S is one.

Figure 7:
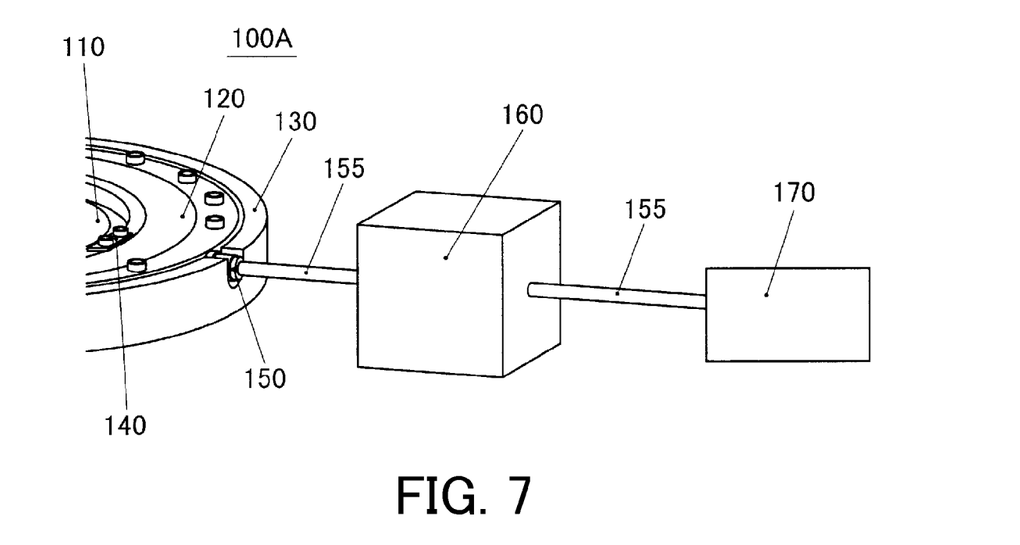
FIG. 7 is a perspective view around a tube member shown in FIG. 4.

FIG. 7 is a perspective view showing the closed container 160 connected to the tube member 150 via the metallic tube 155. Steel wool is spread over the inside of the closed container 160, and allows the pressing air to pass through the steel wool. By utilizing that the thermal conductivity of the air is smaller than that of iron, the compression heat that occurs in the compression transmits to the steel wool. This configuration restrains the temperature change of the air in the compression, and consequently the deterioration of the imaging characteristic caused by the temperature change of the holding apparatus 10A. The closed container 160 is connected to the pneumatic controller 170, such as a servo valve, via the tube 155. While the fluid of this embodiment is air, the present invention does not limit the type of the fluid, such as water or an inert gas. The tube member 150, the closed container 160, and the pneumatic controller 170 serve as a pressing member configured to supply the fluid to the internal space S, to press the internal space S, and to deform the holding member 120 and the lens member 110.

The operational principle is the same as that of FIG. 1. Under the control of the pneumatic controller 170, the air for compression (fluid) is supplied to the internal space S via the closed container 160. The sectional shape of the internal space (closed space) deforms in the compression in a direction in which its volume increases. Since the sectional shape of the internal space S has a parallelogram shape or a similar shape in this embodiment, the internal space S turns in the compression in a direction in which it approaches to the rectangle. The structure of this embodiment does not require a displacement generator, such as an actuator or a spring, maintains the control system simple, and thus is small and prevents the heat from occurring in the operation. In addition, the internal space S of this embodiment is connected over its circumference, its sectional shape changes in the circumferential direction, and it is possible to control a tilt or another deformation of the lens member by using the pressing member provided at one location. The outside of the holding member serves as a fixing point, and the inner part upwardly or downwardly deforms in the compression. If the sectional shape is a rectangle, an upward or downward deformation little occurs. Thus, as the sectional shape is changed in the circumferential direction, a deformation shape of the lens member 110 is determined along with the change. In addition, since the sectional shapes of neighboring spaces are vertically symmetrical, a change of the lens member 110 in the vertical position can be restrained and a predetermined shape change can be obtained.

Second Embodiment

Figure 8:
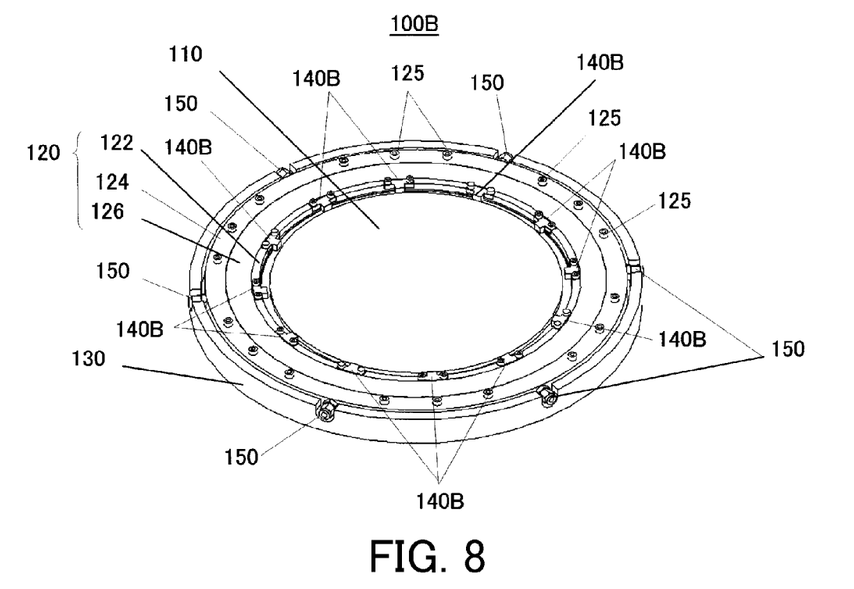
FIG. 8 is a perspective view of a holding apparatus according to a second embodiment.

FIG. 8 is a perspective view of a holding apparatus 100B of a second embodiment. Those elements in FIG. 8, which are the corresponding elements in FIG. 4, are designated by the same reference numerals. The holding apparatus 100B includes twelve elastic fixing members 140B arranged at regular intervals of 30° pitches in the circumferential direction, and six tube members 150 arranged at regular intervals of 60° pitches in the circumferential direction. The closed container 160 and the pneumatic controller 170 shown in FIG. 7 are connected to each tube member 150.

Figure 9:
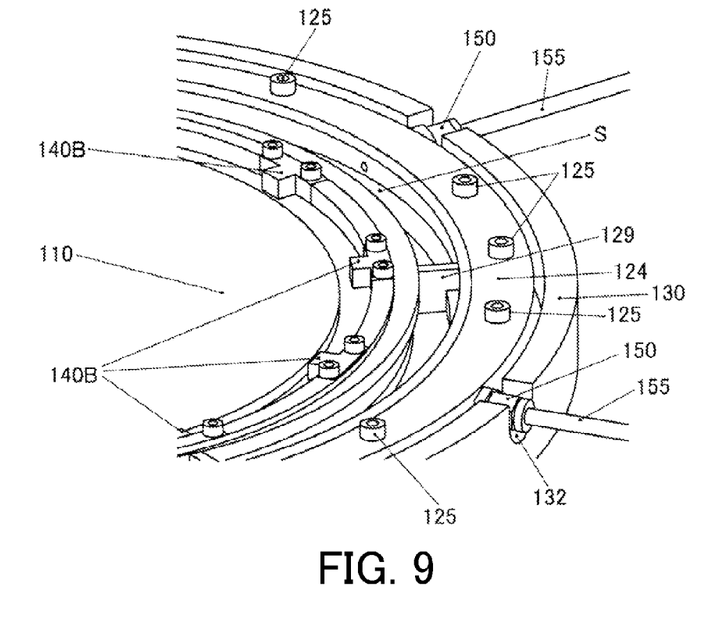
FIG. 9 is a partially enlarged perspective view of the holding apparatus shown in FIG. 8.

FIG. 9 is a partially perspective view in which the upper part 126 is removed and the internal space S is exposed. The internal space S is divided into six sub-internal spaces S by partitions 129. This embodiment divides the internal space S by the partitions 129, and a tube member 150 is connected to each of the six divided sub-internal spaces S. The sectional shape of the internal space S has a parallelogram shape similar to the first embodiment, and the upper and lower deformation directions alternate in the circumference. Therefore, the lens member 110 vertically alternately deforms at three periods in the circumferential direction, and the tube member 150 is connected to each of the six types of sub-internal spaces as a product of three periods and two types of deformations.

Figure 10:
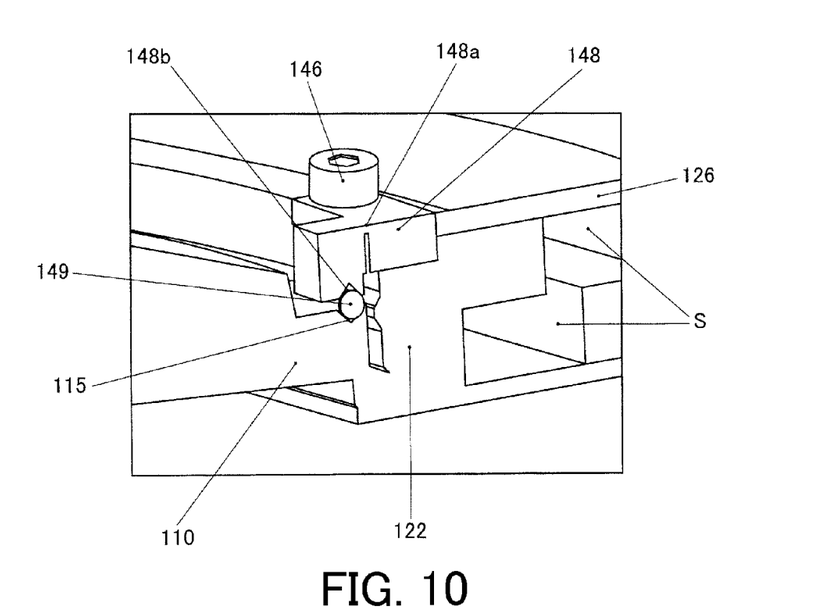
FIG. 10 is a partially enlarged sectional and perspective view of FIG. 9.

FIG. 10 is an enlarged sectional view of and around the elastic fixing member 140. The elastic fixing member 140B contacts the lens member 110 and the holding member 120, and fixes the lens member 110. The elastic fixing member 140B includes a pair of fastening members 146, an elastic member 148, and a ball member 149. The elastic member 148 is fixed onto the inner part 122 of the holding member 120 via the fastening member 146. The elastic member 148 has a forcing member 148a, and a V-shaped groove 148b that extends in the circumferential direction or tangential direction. The lens member 110 also has a V-shaped groove 115 that extends in a corresponding direction. The ball member 149 is located between the elastic member 148 and the lens member 110.

The forcing member 148a of the elastic member 148 applies an elastic force to the lens member 110 in a radial direction and a vertical direction (height direction) of the lens member 110, and fixes the lens member 110. The ball member 149 is held between the two V-shaped grooves 148b and 115, and thereby the elastic member 148, the ball member 149, and the lens member 110 are positioned. In adjusting the rigidity used for the lens member 110 to displace in the lateral (radial) direction, the spring rigidity of the forcing member 148a may be adjusted. The structure shown in FIG. 10 is a mere illustration as a structure of the elastic fixing member 140B configured to fix the lens member 110, and a fixing unit of the lens member 110 is not limited.

Although the operation is similar to that of the first embodiment, this embodiment provides a plurality of sub-internal spaces as closed spaces in the circumferential direction and a predetermined deformation shape can be obtained for each position. A fine adjustment of the deformation shape of the lens member 110 can be obtained by compressing each sub-internal space S with a different pressure.

Third Embodiment

Figure 11:
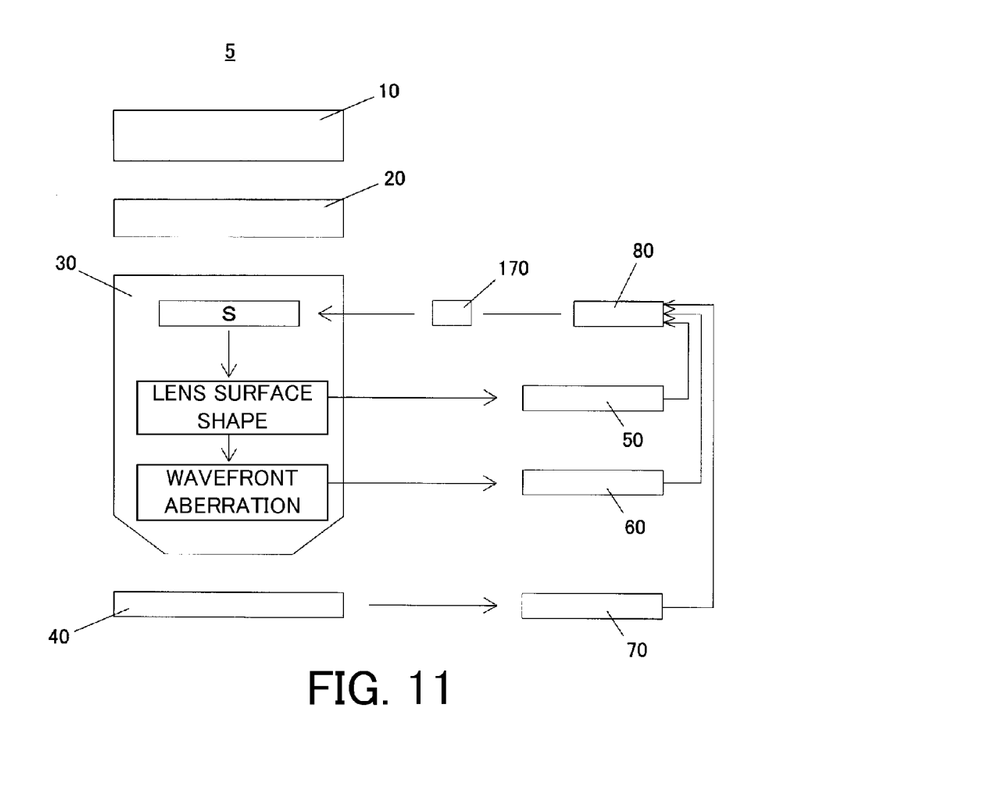
FIG. 11 is a schematic block diagram of an exposure apparatus to which the holding apparatus according to the first or second embodiment is applicable.

FIG. 11 is a block diagram of a feedback control system configured to actively and precisely control a deformation of the lens member 110 by the feedback control while the deformation of the lens member 110 is monitored. FIG. 11 shows an example that applies the feedback control system to the exposure apparatus 5 that includes a projection optical system 30 that serves as the lens member 110.

The exposure apparatus 5 is a projection exposure apparatus configured to expose a pattern of an original 20 onto a substrate 40 via the projection optical system 30, and includes an illumination unit 10 and the projection optical system 30. The illumination unit 10 is an apparatus configured to illuminate the original 20, and includes a light source, and an illumination optical system configured to illuminate the original 20 by the light from the light source. The projection optical system 30 is an optical system configured to project a pattern of the original 20 onto the substrate 40. The lens member included in the projection optical system 30 is held by the holding apparatus of the first or second embodiment. The substrate 40 is supported and driven by a substrate stage.

Reference numeral 50 denotes a measurement apparatus configured to measure a surface shape of the lens member. The measurement apparatus 50 can use a displacement sensor configured to measure displacements of the lens member 110 and the holding member 120, a strain gauge configured to measure strains of the lens member 110 and the holding member 120, and a CCD sensor configured to detect an aberration error of an image imaged by the lens member 110. Reference numeral 60 denotes a measurement apparatus, such as a CCD sensor, configured to measure the wavefront aberration of the projection optical system 30. Reference numeral 70 denotes a measurement apparatus, such as a SEM, configured to measure a resolution characteristic of the developed substrate 40. Reference numeral 80 denotes an operating part configured to operate a press amount to the internal space S of the holding apparatus for the projection optical system 30 based on a measurement result of the measurement apparatuses 50 to 70 configured to measure the characteristic of the lens member (optical element). The characteristic of the optical element includes a surface shape, a wavefront aberration, a resolution characteristic, etc. The pneumatic controller 170 supplies the air for compression to the internal space S based on the operation result by the operating part 80, and deforms the lens member 110. The surface shape of the deformed lens member 110 is again measured by the measurement apparatus 50, etc., and the compression amount to the internal space S is adjusted. This configuration can ultimately provide the lens member 110 in the projection optical system 30 with a predetermined surface shape.

Since the exposure apparatus 5 shown in FIG. 11 eliminates the aberration and the own weight deformation of the projection optical system 30, the pattern of the original 20 can be exposed onto the substrate 40 highly precisely.

A method for manufacturing a device (such as a semiconductor integrated circuit device or a liquid crystal display device) includes an exposing step of exposing a substrate onto which a photosensitive agent has been applied, using the exposure apparatus 5, a developing step of the substrate, and other known steps.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-227612, filed Sep. 4, 2008, which is hereby incorporated by reference herein in its entirety.

What is claimed is:

1. A holding apparatus comprising:
   a holding member configured to hold an optical element, the holding member having an internal space that extends in a circumferential direction and has different sectional shapes perpendicular to the circumferential direction on at least two locations;
   a fixing member arranged outside of the holding member and configured to fix the holding member from an outside of the holding member; and
   a pressing member configured to press the internal space by supplying a fluid to the internal space, and to deform the holding member, wherein the holding member includes a partition configured to divide the internal space in the circumferential direction into a plurality of sub-internal spaces, and the holding apparatus further comprises one pressing member for each sub-internal space divided by the partition.

2. The holding apparatus according to claim 1, wherein a plurality of pairs of a part configured to upwardly deform the holding member and a part configured to downwardly deform the holding member are periodically arranged in the internal space in the circumferential direction.

3. The holding apparatus according to claim 1, wherein the internal space is connected over a circumference in the circumferential direction, and the holding apparatus includes one pressing member.

4. The holding apparatus according to claim 1, wherein a section of the internal space perpendicular to the circumferential direction has a parallelogram shape.

5. The holding apparatus according to claim 1, wherein a shape that is made by connecting a plurality of ends of the internal space to each other is a parallelogram on a section of the internal space perpendicular to the circumferential direction.

6. An exposure apparatus comprising a feedback control system, the feedback control system including a holding apparatus configured to hold an optical element, a measurement apparatus configured to measure a characteristic of the optical element, and an operating part configured to operate a press amount of an internal space of the holding apparatus based on a result of the measurement apparatus,
   wherein the holding apparatus includes:
   a holding member configured to hold the optical element, the holding member having the internal space that extends in a circumferential direction and has different sectional shapes perpendicular to the circumferential direction on at least two locations;
   a fixing member arranged outside of the holding member and configured to fix the holding member from an outside of the holding member; and
   a pressing member configured to press the internal space by supplying a fluid to the internal space, and to deform the holding member, wherein the holding member includes a partition configured to divide the internal space in the circumferential direction into a plurality of sub-internal spaces, and the holding apparatus further comprises one pressing member for each sub-internal space divided by the partition.

7. A device manufacturing method comprising:
exposing a substrate using an exposure apparatus; and
developing the substrate that has been exposed,
wherein the exposure apparatus includes a feedback control system, the feedback control system including a holding apparatus configured to hold an optical element, a measurement apparatus configured to measure a characteristic of the optical element, and an operating part configured to operate a press amount of an internal space of the holding apparatus based on a result of the measurement apparatus,
wherein the holding apparatus includes:
a holding member configured to hold the optical element, the holding member having the internal space that extends in a circumferential direction and has different sectional shapes perpendicular to the circumferential direction on at least two locations;
a fixing member arranged outside of the holding member and configured to fix the holding member from an outside of the holding member; and
a pressing member configured to press the internal space by supplying a fluid to the internal space, and to deform the holding member, wherein the holding member includes a partition configured to divide the internal space in the circumferential direction into a plurality of sub-internal spaces, and the holding apparatus further comprises one pressing member for each sub-internal space divided by the partition.

* * * * *